UNITED STATES PATENT OFFICE.

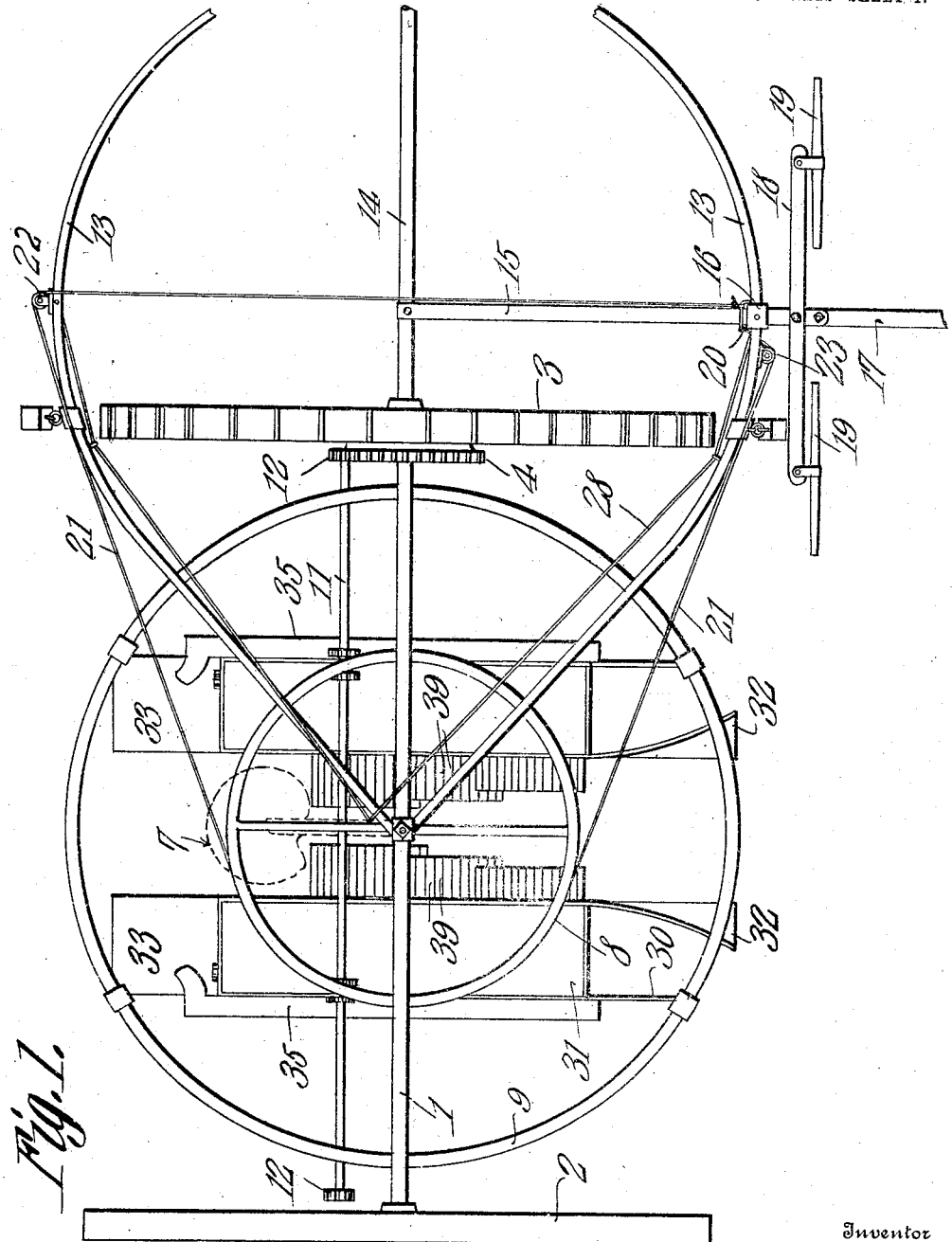

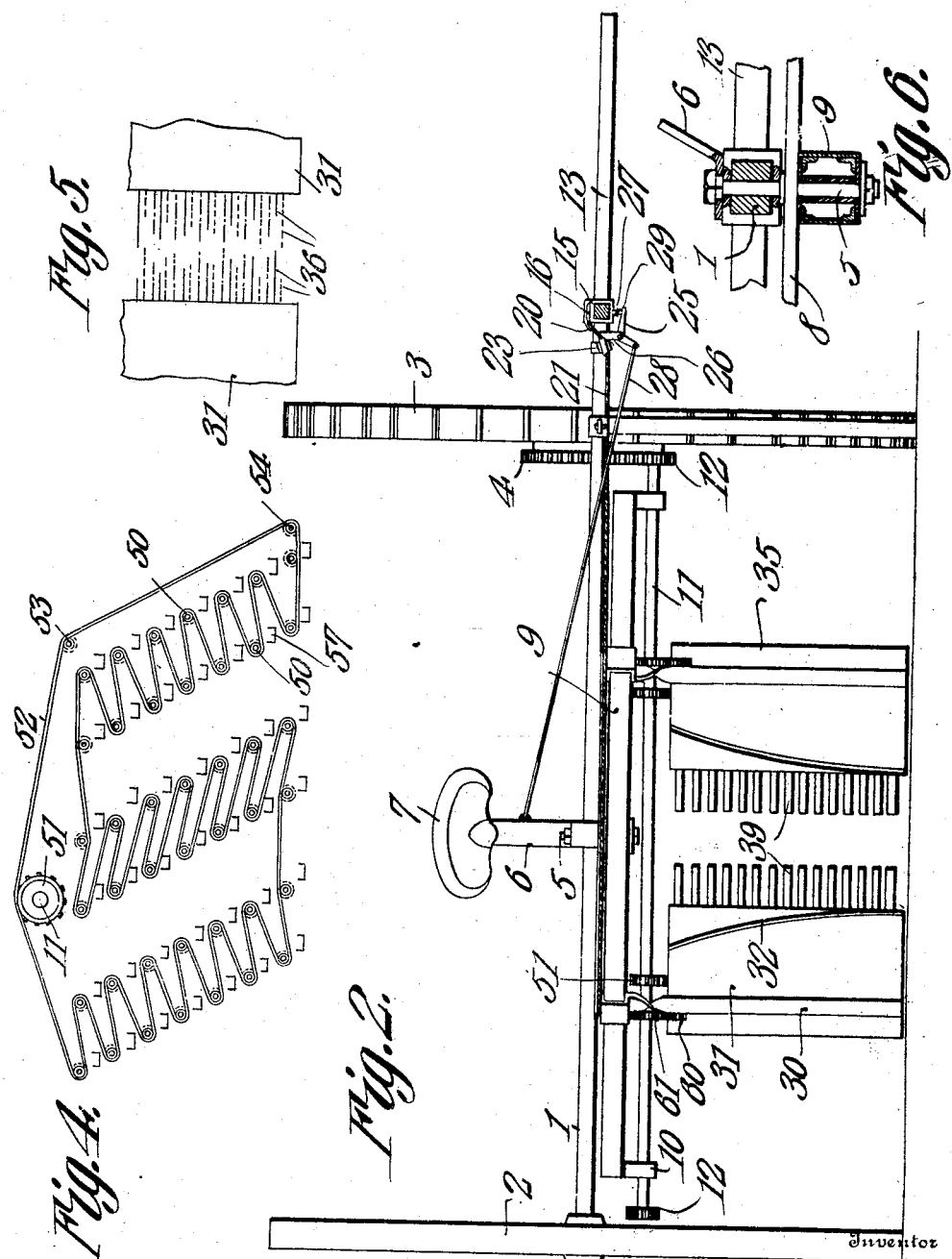

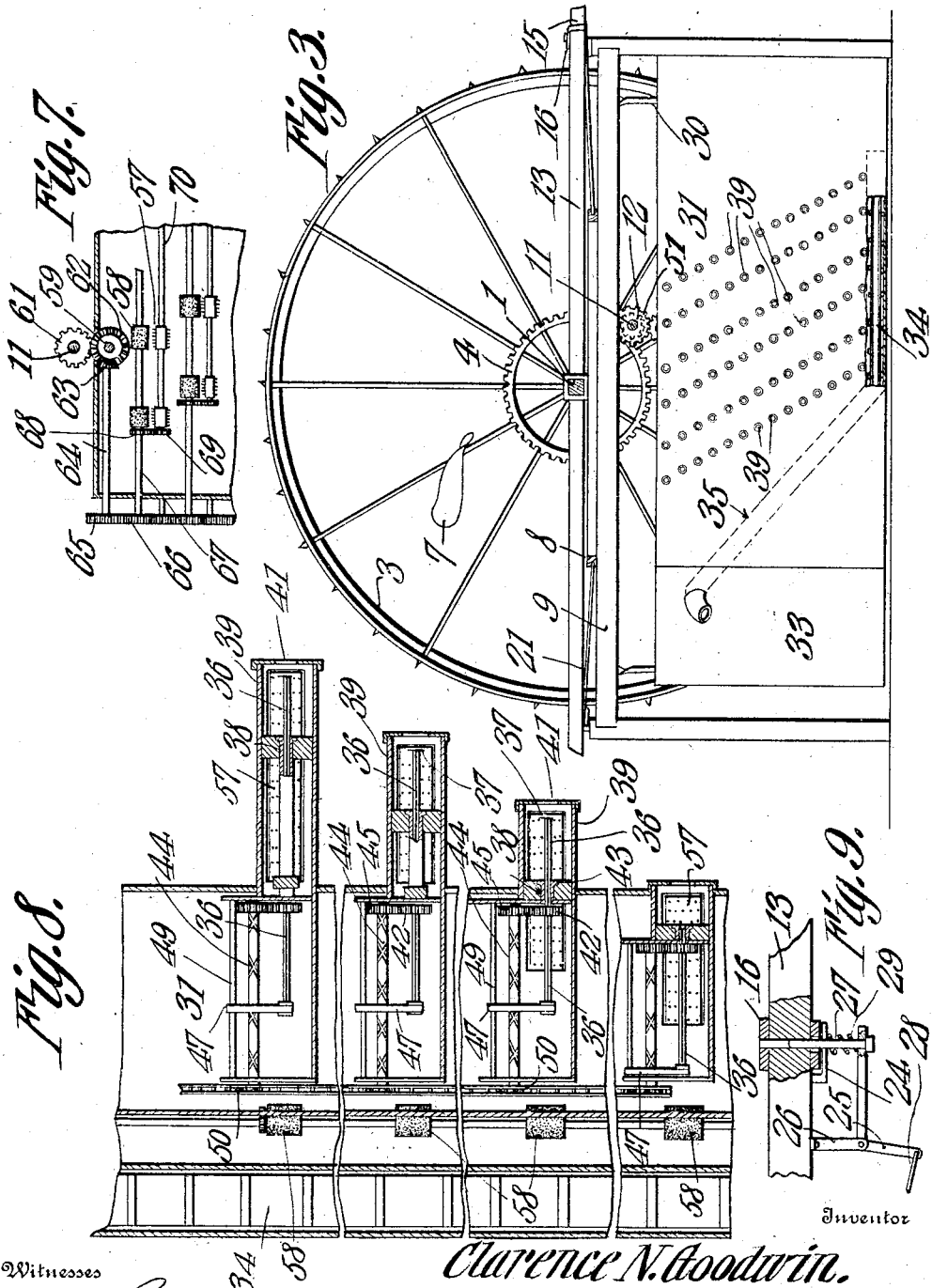

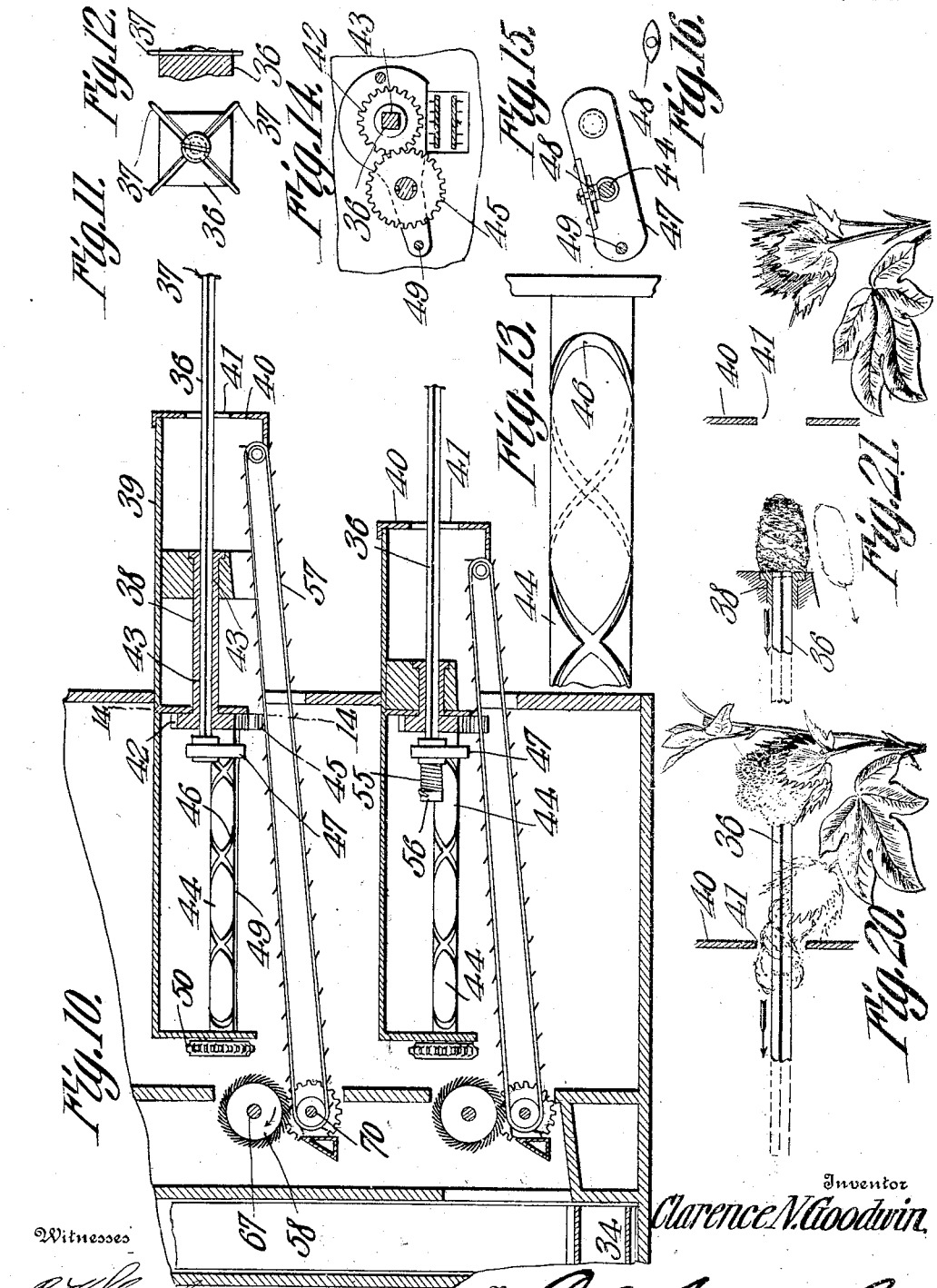

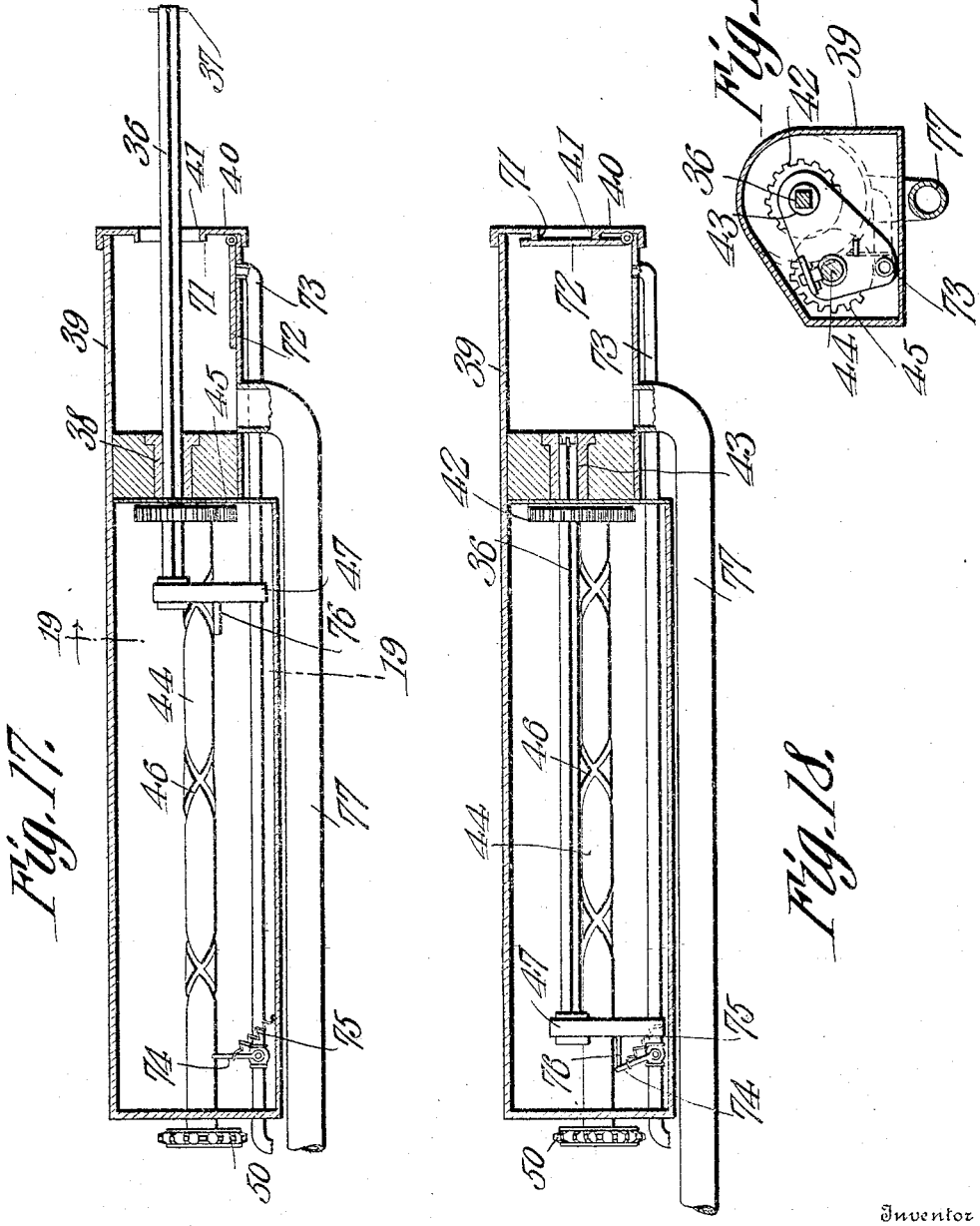

CLARENCE N. GOODWIN, OF WASHINGTON, DISTRICT OF COLUMBIA.

COTTON-HARVESTER.

939,008.  Specification of Letters Patent.  Patented Nov. 2, 1909.

Application filed February 13, 1909. Serial No. 477,731.

*To all whom it may concern:*

Be it known that I, CLARENCE N. GOODWIN, a citizen of the United States, residing at Washington, in the District of Columbia, have invented a new and useful Cotton-Harvester, of which the following is a specification.

This invention has relation to cotton harvesters, and it consists in the novel construction and arrangement of its parts, as hereinafter shown and described.

The object of the invention is to provide a cotton harvester in which a frame is included which carries mechanism for removing the bolls from cotton plants, and which is pivotally mounted with relation to a wheel-supported axle or running-gear. A draft means is connected with the said frame and is adapted to swing horizontally with the frame whereby the position of the frame may be reversed with relation to the axle or running-gear, so that the implement may be brought to a reverse work facing position at the end of a row of cotton plants without necessitating the turning of the axle or running-gear. In connection with the said reversible draft means a frame locking mechanism is provided whereby the said frame and draft means is rigidly secured in either of its positions with relation to the axle or running-gear. A master-wheel is carried by the axle or running-gear, and a master shaft is journaled for rotation upon the said frame and is provided at its opposite ends with gear wheels which are adapted to be brought alternately in mesh with the said master wheel.

A further object of the invention is to provide, in a cotton harvester, a reciprocatory picker journaled for rotation, and means for removing leaves and sticks from the cotton while it is on the picker, and also means for stripping the cotton from the picker. Resilient fingers are mounted at the work-engaging end of the picker, and are adapted to engage the fiber of the bolls, and it is by reason of such contact between the fingers and the fiber of the bolls that the latter are removed from the stems and carried toward a conveyer mounted for movement adjacent the picker, which conveyer is adapted to convey the staple to a conveyer common to all of the first said conveyers, from which it is carried to a convenient place, where it may be bagged or deposited in receptacles provided for its reception.

A further object of the invention is to provide, as a modification, a pneumatic conveyer which is adapted to remove the cotton from the point of delivery from the picker to the conveyer common to all of the first said conveyers; and, in connection with the pneumatic conveyer, is provided means for closing the port of a chamber into which the work-engaging end of the picker retracts when it delivers the cotton. Said means consists of a valve which is actuated by a blast of air which serves as a medium for conveying the cotton from the said chamber, and the said pneumatic conveyer is rendered active only at the end of the retractory stroke of the picker. The reciprocatory movement of the picker occurs in a horizontal line or plane, and preparatory to removing the cotton bolls from the branches, means is provided for positioning the said branches, in order that the operation of removing the staple therefrom may be facilitated. The said means consists of opposed shields or guides, which are flared at their forward end portions, and through which the said picker, or a series of pickers, is adapted to operate.

In the employment of a series of pickers, they are arranged at different elevations, and a separate means is provided for operating each picker, while a means common to all of the said operating means is provided for actuating the same, the last said means being operatively connected with the above referred to master shaft.

Inasmuch as the branches of a cotton plant are thickest near the ground and diminish in number toward the top of the plant, it is desirable that the work-engaging ends of some of the pickers should approach nearer the central stalk of the plant than others. This is essential, for the reason that the open bolls occur not only at the outer ends of the branches, but also at points within the general perimeter of the plant, and therefore it is necessary to provide pickers to penetrate through the branches and engage those bolls which are located within the same.

It is one of the objects of the present invention to so mount the pickers as to operate upon the plants in the manner last above described, and, at the same time, having the means for operating the pickers located one above the other.

A further object of the invention is to provide a reciprocating picker as indicated with a series of resilient fingers, which are adapted to engage the fiber of the bolls, and in connection with which is provided a stripping means for removing the staple from the said fingers at the end of the retractory stroke of the picker.

Again, it is necessary to so mount some of the pickers that should they come in contact with the thicker portions of the stalks they may be temporarily checked in their reciprocatory movement, to avoid breakage or damage to the parts of the machine, and it is one of the objects of this invention to provide for such a contingency.

A still further object of the invention is to provide, as a means for actuating the pickers, shafts journaled for rotation which are provided with continuous helical peripheral grooves, and means attached to the said pickers for engaging the said grooves to effect the reciprocatory movement upon the part of the pickers as indicated.

While the description of structure hereinafter given follows in detail that illustrated in the drawings, it is to be understood that various changes in structure and minor details may be resorted to, which changes do not amount to a departure from the spirit involved in the subject matter set forth in the appended claims.

In the accompanying drawings:—Figure 1 is a plan view of the cotton harvester with parts broken away. Fig. 2 is a front elevation of the cotton harvester, with parts broken away. Fig. 3 is a vertical sectional view of the harvester. Fig. 4 is a detail side elevation, showing the means in common for actuating all of the pickers from the master shaft. Fig. 5 is a fragmentary diagrammatic view, illustrating the manner in which the work-engaging ends of some of the pickers may approach nearer the central stalks of the plants than others. Fig. 6 is a detail sectional view, showing the manner in which the frame of the picker is pivotally connected with an axle or running-gear by means of a king bolt. Fig. 7 is a detail side elevation of means operatively connected with the master shaft for actuating endless belt conveyers and stoppers coöperating with the same. Fig. 8 is a vertical sectional view of a series of pickers, showing the same in retracted and semi-retracted position. Fig. 9 is a detail view, partly in section, of means for locking the reversible draft means with relation to the running-gear of the harvester. Fig. 10 is an enlarged sectional view of the pickers and adjacent parts, showing one of the pickers rigidly mounted for reciprocatory movement, and another picker resiliently mounted for such movement. Fig. 11 is an end view of the work-engaging end of one of the pickers. Fig. 12 is a sectional view of the same. Fig. 13 is an enlarged side elevation of an end portion of a shaft employed to reciprocate a picker. Fig. 14 is a transverse sectional view of a picker and attached parts, cut on the line 14—14 of Fig. 10. Fig. 15 is a side elevation of the means for connecting the picker with the groove of the actuating shaft. Fig. 16 is a detail side elevation of a pin used in the mechanism illustrated in Fig. 15. Fig. 17 is a sectional view of a modified form of picker mechanism, showing the picker in projected position. Fig. 18 is a similar view, showing the picker in retracted position. Fig. 19 is a transverse sectional view of the picker, illustrated in Figs. 17 and 18, cut on the line 19—19 of Fig. 17. Figs. 20 and 21 are schematic views illustrating the manner in which the picker removes the cotton from the bolls. Fig. 22 is a detail view of a portion of the frame of the harvester showing a prop pivoted thereto.

The cotton harvester includes a running-gear which consists of an axle 1, which is mounted at one end upon a ground wheel 2, and at its opposite end upon a traction wheel 3. A gear rim 4 is mounted for rotation with the traction wheel 3 and is concentrically arranged with relation to the shaft 1. A king bolt 5 passes vertically through the middle of the axle 1, and is pivoted in the said axle. A seat post 6 is fixed to the upper portion of the bolt 5, and an operator's seat 7 is mounted upon the upper end of the said post 6. A disk 8 is pivoted upon the bolt 5 below the axle 1, and is fixed to the middle portion of a frame 9. The said frame 9 is fixed to the lower portion of the king bolt 5. Hangers 10 depend from the ends of the frame 9, and a master shaft 11 is journaled in the lower portions of the said hangers.

Pinions 12 are mounted at the ends of the shaft 11, and are adapted to mesh with the rim 4. An approximately ovate draft frame 13 is fixed at one end portion with relation to the axle 1, and the said frame 13 surrounds the traction wheel 3 in a manner substantially as illustrated in Fig. 1 of the drawings. A cross beam 14 is supported within the frame 13, and a draft beam 15 is pivoted at one end to the said cross beam 14. A guide 16 is fixed to the draft 15, and receives the outer portion of the frame 13, which portion is substantially semicircular in plan. The draft beam 15 lies transversely across the frame 13, and a draft tongue 17 is attached to that end of the beam 15 which lies beyond the frame 13. A double-tree 18 is mounted upon the projecting portion of the beam 15, and swingletrees 19 are attached to the ends of the double-tree 18 in the usual manner. An eye 20 it attached to the guide 16. A cable 21 is attached at one end to the eye 20 and passes around a pulley 22 mounted upon the frame 13, and thence around the disk 8, and then around a pulley 23, located at the opposite side of the frame 13, and the other end of the said cable 21 is also attached to the eye 20. Stops 24 are mounted at the opposite sides of the frame 13 and are adapted to be engaged by the guides 16, and limit the swinging movement of the draft beam 15.

Catches are attached to the frame 13 in the vicinity of each of the stops 24 and each catch consists of a rocker arm 25, pivotally mounted in a depending lug 26, and connecting at one end with a pin 27 adapted to pass through registering perforations provided in the stops 24 and the guides 16 and frame 13. A cable 28 is attached to the other end of the rocker 25, and extends to the seat post 6 or other point within convenient reach of one occupying the seat 7.

Presuming that the parts are in the positions shown in Fig. 1 of the drawings, and the implement is drawn along a row of plants and operates upon the same in the manner hereinafter to be explained, when the implement arrives at the end of the row the operator pulls that cable 28 which is attached to the rocker arm 25 engaging the pin 27 which passes through the registering perforations of the stop 24, guides 16 and frame 13. Thus the draft beam 15 is rendered free to describe an arc, and the draft animals may be turned around the outer arcuate portion of the frame 13, and thus the cable 21 will be moved longitudinally, and, through the movement of the said cable, the disk 8 will be rotated with relation to the axle 1, and the king bolt 5 will also be rotated. Thus the seat post 6 is turned as is also the frame 9, and when the guides 16 arrive at the stop 24 at the opposite side of the frame 13, a spring 29, which is operatively connected with the pin 27, forces the said pin at the opposite side of the frame 13 through the registering perforation of the stop 24 and the guide 16 and frame 13 when said pin is released by the operator. By this means the frame 9 and its attachments, together with the draft means, is reversed with relation to the axle 1, and the implement may be drawn back along another row of standing plants, without turning the axle 1 in a horizontal plane. As the frame 9 is turned, as above described, the gear-wheel 12 which previously has been in mesh with the master wheel 4 is moved away from the same, and the gear wheel 12 at the opposite end of the shaft 11 is brought into mesh with the master wheel 4.

Brackets 30 depend from the frame 9 and are approximately U-shaped in side elevation. Housings 31 are supported by the brackets 30 and are located at opposite side portions of the said frame 9. The inner faces of the housings are spaced from each other, and are provided at their forward ends with guides 32. The forward end portions of the guides 32 diverge from each other in the manner illustrated in Figs. 1 and 2 of the drawings. The said guides 32 are adapted to engage the branches of the plants and position the same preparatory to the operation of the pickers, hereinafter to be described, upon the staple carried by the said branches. A receptacle 33 is located at the rear end of each housing 31 and may be used for the purpose of receiving the staple after it has been harvested, or, in lieu of the said receptacles, platforms may be provided, upon which bags may be placed to perform the same function. Endless conveyer belts 34 (best shown in Fig. 3) are mounted for orbital movement along the lower portions of the housing 31, and are adapted to communicate with tubes or other elevating devices, such for instance as is designated at 35, in Fig. 3, the said tube, as shown, having its delivery end located at the upper portion of the receptacle 33. The endless belt 34 may be operatively connected by any desired mechanical means with the master shaft above referred to, and as such connection is merely a matter of mechanical arrangement, it is thought that further reference thereto is unnecessary.

Proceeding now to a detailed description of the form of picker illustrated in Figs. 8 and 10 of the drawings, it will be seen that the picker consists of a non-circular shaft 36, to the work-engaging end of which are attached cruciform resilient fingers 37. The end portions of the said fingers 37 project beyond the side of the picker shaft 36. A sleeve 38 is journaled for rotation in the inner side portion of the housing 31, and a chamber 39 surrounds the inner end of the said bushing and is provided with a head 40 which, in turn, is provided with a port 41 through which the picker shaft 36 is adapted to project as it advances toward the branches of the plant.

A gear-wheel 42 is mounted upon the outer end of the sleeve 38, and the said sleeve 38 is provided with a non-circular opening 43 which snugly receives the picker shaft 36. A shaft 44 is journaled for rotation in the housing 31 and is provided at one end with a gear wheel 45, which meshes with the gear wheel 42. The said shaft 44 is provided upon its periphery with a continuous helical groove 46. An arm 47 is fixed to the outer end of the picker shaft 36 and is provided with a pin or lug 48, which enters the groove 46 in the shaft 44. Fig. 16 is a detailed side elevation of the said pin or lug 48. A guide rod 49 is mounted in the housing 31 and extends parallel with the shaft 44, and the arm 47 is provided with a perforation which snugly receives the said guide rod. The outer end of the shaft 44 is provided with a sprocket wheel 50. A sprocket wheel 51 is mounted upon the master shaft 11, and an endless sprocket chain 52 passes over the sprocket wheel 51 and thence around sprocket wheels 53 and 54, journaled for rotation against the side of the housing 31, and thence around all of the sprocket wheels 50 of the entire series of picker-operating shafts, in a manner as illustrated in Fig. 4 of the drawings. Thus all of the picker-actuating shafts of the series derive motion from a common source, and it will be readily understood that as the shaft 44 rotates the picker 36 is reciprocated in the sleeve 38 by means of the pin 48 carried by the arm 47, which is located in the helical groove 46. At the same time, by reason of the fact that the shaft 44 is rotated, rotary movement is transmitted through the intermeshing gear wheels 45 and 42 to the sleeve 38, and therefore the picker shaft 36 is rotated at the same time that it is reciprocated.

By reference to Fig. 10 of the drawings, it will be observed that the connection between the picker shaft 36 and the actuating shaft 44, as illustrated at the upper portion of the figure, is positive, while the connection between the said picker shaft 36 and the shaft 44, as illustrated at the lower portion of the said figure, is of a resilient nature; that is to say, in the latter instance the picker shaft is slidably mounted in the arm 47 and a coil spring 55 is interposed between a collar 56, fixed to the outer end of the shaft 36 and the said arm 47, consequently, should the inner end of the picker 36 come in contact with an obstruction, the arm 47 may continue in its reciprocatory movement, while the said picker shaft will momentarily be brought to a state of rest, the said spring 55 compensating for the lost movement on the part of the picker, and as soon as the obstruction has been passed the tension of the said spring comes into play and moves the picker 36 to its normal position with relation to the arm 47. Thus should the picker engage a large stalk of the plant it may, for a time, seek to advance toward the plant, and thus provision is made for avoiding unnecessary damage to the machine by encountering obstructions as indicated.

It will be understood that as the picker 36 advances toward the plant and rotates in the manner stated that as soon as the projecting fingers 37 engage the fiber of an open boll the said boll is given a slight twist which has the effect of severing the same from the branch at a weak point of the stem. Then, as the picker shaft 36 retracts toward the sleeve 38 the boll, with the hull remaining upon the same is passed toward the port 41 in the chamber head 40. When the boll arrives at this point the hull comes in contact with the edges of the said port and is cracked and removed from the cotton. The said head acts in a similar manner upon such leaves and stems as should adhere to the boll, and also by reason of the fact that the boll is brought in contact with the edges of the port 41 a greater portion of sand and grit which possibly is carried by the same, is liberated at that point and falls to the ground. As the picker 36 continues in its retractive movement the cleaned boll is carried into the chamber 39, and when the fingers 37 come in contact with the end of the sleeve 38 the said fingers are bent from their lateral relation with the longitudinal axis of the picker 36 into parallel relation and the boll is pushed from the ends of the fingers by the end of the sleeve 38. The cotton thus liberated falls upon an endless belt conveyer 57 located below the inner end of the sleeve 38 and which, at its upper run, enters the chamber 39. The conveyer 57 passes transversely through the housing 31, and, at its outer end, passes under a doffing brush 58, which is journaled for rotation at the outer portion of the said housing 31.

Countershafts 59 are journaled for rotation below the master shaft 11, and each counter shaft is provided with a pinion 60 which meshes with a pinion 61 carried by the said master shaft 11. Beveled pinions 62 are also mounted upon the countershaft 59 and mesh with beveled pinions 63 which are fixed to the shafts 64. The rear ends of the shafts 64 are provided with a pinion 65 which meshes with a train of gear wheels 66. Each of the gear wheels 66 is mounted upon a shaft 67, and the said shafts 67 support the doffer brushes 58. Each shaft 67 is provided with a relatively small gear wheel 68 which meshes with a relatively large gear wheel 69, and the said gear wheels 69 are mounted upon the shafts 70, which actuate the endless conveyers 57. By this arrangement it will be seen that the shafts 67 and 70 rotate at different rates of speed, and that the shafts 67 rotate faster than the shafts 70. Therefore, when the material is carried back upon the upper runs of the conveyers 57 and is engaged by the doffer wheels 58, it is removed from the said conveyers and cast into the side portion of the housing 31, and from thence falls upon the endless conveyer 34, as above described.

Figs. 17, 18 and 19 of the drawings illustrate a modified form of means for conveying the cotton from the chamber 39, and of which modification the following is a detailed description. The port 41 in the head 40 is provided at its inner side with a valve seat 71. A valve 72 is hinged in the chamber 39 and normally lies upon the bottom of the said chamber, but is so positioned that when swung upon its hinge it is adapted to close against the valve seat 71 at the inner side of the port 41. An air pipe 73 communicates with the chamber 39 at a point below the valve 72 when the same is in its normal position as above indicated. The pipe 73 is provided with a valve 74, which is normally retained in a closed position by means of a spring 75. The stem of the valve 74 is located in the path of movement of an arm or projection 76 carried by the arm 47. An eduction pipe 77 communicates with the chamber 39 at a point between the end of the pipe 73 and the end of the sleeve 38. Thus it will be seen that when the cotton is brought into the chamber 39 and removed from the picking fingers in the manner as above described, that approximately at the same time the lug 76 carried by the arm 47 will strike the stem of the valve 74 and open the said valve against the tension of the spring 75. Thus air, under pressure, is permitted to flow through the pipe 73, and, when the column of air strikes the under side of the valve 72, the said valve is swung up upon its hinge and closed against the seat 71. Thus the chamber 39 is filled with compressed air and the cotton falls into the upturned mouth of the eduction pipe 77. As the only means of escape for the air from the chamber 39 is through the said eduction pipe, the cotton is forced along the column of air and is conveyed to a delivery point. Inasmuch as the means for supplying compressed air for such devices is a matter of common knowledge, it is thought unnecessary to go into further detail in this specification to show or describe a matter so generally known.

As soon as the picker 36 begins to advance toward the plant, and the lug 76 moves beyond the path of movement of the stem of the valve 74, the tension of the spring 75 comes into play and closes the said valve, and the valve 72 falls into its normal position.

Having described my invention, what I claim as new, and desire to secure by Letters Patent, is:—

1. In a cotton harvester, a shaft journaled for rotation and having a continuous groove, a sleeve journaled for rotation, a picker slidably mounted in the sleeve, and means carried by the picker for engaging the groove in said shaft.

2. In a cotton harvester, a shaft journaled for rotation and having a continuous groove, a sleeve journaled for rotation, a picker slidably mounted in the sleeve and rotating with the same, and means carried by the picker for engaging the groove in the said shaft.

3. In a cotton harvester, a shaft journaled for rotation and having a continuous groove, a sleeve journaled for rotation and operatively connected with the said shaft, a picker slidably mounted in said sleeve and rotating with the same and means mounted upon the picker and engaging the groove in the said shaft.

4. In a cotton harvester, a shaft journaled for rotation, a gear wheel fixed to the shaft, said shaft having a continuous groove, a sleeve journaled for rotation, a gear wheel carried by the sleeve and meshing with the gear wheel upon the shaft, a picker slidably mounted in the sleeve and rotating with the same and means carried by the picker and engaging the groove in the said shaft.

5. In a cotton harvester, a shaft journaled for rotation and having a continuous groove, a gear wheel mounted upon the said shaft, a sleeve journaled for rotation, a gear wheel carried by the sleeve and meshing with the first said gear wheel, a picker slidably mounted in the sleeve and rotating with the same, and means resiliently supported upon the picker and engaging the groove in said shaft.

6. In a cotton harvester, a picker mounted for reciprocation, means for stripping the cotton from the picker, and a pneumatic conveyer for receiving the cotton from the picker, which conveyer is rendered active approximately at the end of the retractive stroke of the picker and inactive while the picker is projected.

7. In a cotton harvester, a picker mounted for reciprocation, a stripper for the picker, a chamber having a port through which the work engaging end of the picker may retract, a valve for closing said port, means for introducing air in the port to close said valve and to convey the staple, and an eduction pipe connected with the chamber.

8. In a cotton harvester, a picker mounted for reciprocation, a stripper for the picker, a chamber surrounding the stripper and having a port through which the work engaging end of the picker may retract, a valve located in the chamber, means for introducing air into the chamber to close the valve and to convey the staple removed from the picker, and an eduction pipe connected with the chamber.

9. In a cotton harvester, a picker mounted for reciprocation, a stripper for the picker, a chamber having a port through which the picker may retract, said port serving as a cleaner, a valve located in the chamber, means for introducing air into the chamber to close the valve, and to convey the staple removed from the picker, and an eduction pipe connected with the chamber.

10. In a cotton harvester, a picker mounted for reciprocation, a stripper for the picker, a chamber having a port through which the picker may retract, a valved air pipe communicating with the chamber, means carried by the picker for opening the valve upon the retractive stroke of the picker, and an eduction pipe connected with the chamber.

11. In a cotton harvester, a shaft journaled for rotation and having a peripheral groove, a picker mounted for reciprocation, means mounted upon the picker, and engaging the groove of the shaft, a stripper for the picker, a chamber having a port through which the picker may retract, a valved air pipe communicating with the chamber, means carried by the picker for opening the valve in the said pipe at the retractive stroke of the picker, and an eduction pipe connected with said chamber.

12. In a cotton harvester, a shaft journaled for rotation and having a groove, a picker mounted for reciprocation, means carried by the picker and engaging the groove of the shaft, a stripper for the picker, a chamber having a port through which the picker may retract, an air pipe communicating with the chamber and having a spring retained valve, means carried by the picker for opening the valve upon the retractive stroke of the picker, and an eduction pipe connected with the chamber.

13. In a cotton harvester, a shaft journaled for rotation and having a continuous groove, a picker mounted for reciprocation, means carried by the picker and engaging the groove of said shaft, a stripper for the picker, a chamber having a port through which the picker may retract, a valved air pipe communicating with the chamber, means carried by the picker for opening the valve in said pipe upon the retractive stroke of the picker and an eduction pipe communicating with the chamber.

14. In a cotton harvester, a picker mounted for reciprocation, a chamber for receiving the work engaging end of the picker at the end of the retractive stroke of the picker, and a pneumatic conveyer connected with the picker, which conveyer is rendered active near the end of the retractive stroke of the picker, and inactive while the picker is projected.

15. A cotton harvester comprising a wheel supported axle, a pinion carried by the axle, a frame pivotally mounted with relation to the axle, pickers carried by the frame, a master shaft operatively connected with the pickers and carrying at its ends pinions, and means for turning the frame to bring the pinion at either end of said shaft in mesh with the pinion carried by the axle.

In testimony that I claim the foregoing as my own, I have hereto affixed my signature in the presence of two witnesses.

CLARENCE N. GOODWIN.

Witnesses:
E. DANIELS,
JAS. M. WALKER.